United States Patent [19]

Maund

[11] Patent Number: 4,702,618
[45] Date of Patent: Oct. 27, 1987

[54] RADIOMETER

[75] Inventor: John K. Maund, Birmingham, England

[73] Assignee: Admiral Design and Research Limited, Bristol, United Kingdom

[21] Appl. No.: 698,293

[22] Filed: Feb. 5, 1985

[30] Foreign Application Priority Data

Feb. 18, 1984 [GB] United Kingdom ............... 8404343

[51] Int. Cl.$^4$ .............................................. G01J 5/04
[52] U.S. Cl. .................................. 374/121; 374/126;
374/102; 374/103
[58] Field of Search ............... 374/121, 123, 129, 130,
374/126, 133, 124, 139, 120, 2, 102, 103;
250/238, 239; 356/43, 44, 45, 216, 220; 73/5;
136/225

[56] References Cited

U.S. PATENT DOCUMENTS

| | | | |
|---|---|---|---|
| 2,510,397 | 6/1950 | Hansell | 136/225 |
| 3,160,009 | 12/1964 | Carney | 374/120 |
| 3,352,156 | 11/1967 | Beitz | 374/123 |
| 3,916,690 | 11/1975 | Brandli | 374/124 |
| 4,031,739 | 6/1977 | Springer | 73/5 |
| 4,342,912 | 8/1982 | Adamson | 374/123 |

Primary Examiner—Charles Frankfort
Assistant Examiner—Thomas B. Will
Attorney, Agent, or Firm—Welsh & Katz, Ltd.

[57] ABSTRACT

A thermal radiometer for measuring thermal irradiation, includes a housing, a shutter mounted on a wall of the housing, a thermally conductive element positioned behind the shutter, the conductive element having a black surface facing the shutter, and a device for measuring the temperature of the conductive element. The outer face of the shutter is thermally reflective, and the radiometer includes a circuit for calculating the rate of temperature rise of the conductive element after opening the shutter and an indicator responsive to the calculating circuit for displaying a value which is proportional to the rate of temperature rise. A method for measuring thermal irradiation with the apparatus includes the steps of positioning a thermally conductive element having a black surface behind a shutter with the black surface facing the shutter, allowing the element to assume ambient temperature, opening the shutter and measuring the subsequent rate of temperature rise of the element, and using the rate of temperature rise to determine the level of irradiation.

5 Claims, 5 Drawing Figures

RADIOMETER

This invention relates to a radiometer for measuring thermal irradiation and also to a method of measuring irradiation.

Radiant heaters are now being used in large industrial buildings such as aircraft hangars in place of convection heaters, since it has been found that radiant heaters can create a comfortable working environment with a much lower power consumption. In designing the construction and layout of such radiant heaters, a simple radiometer is required to measure the level of thermal radiation, but presently known radiometers suffer from being of complex construction. For example, one known type of radiometer uses thermocouples in which one junction of each thermocouple is blackened to absorb radiant energy and the other junction is positioned in a heat sink and the output of the thermocouple is measured at equilibrium to determine the level of irradiation. Equilibrium is reached when the rate of heat loss of the blackened junction is equal to the rate at which heat is absorbed. Heat is lost primarily by radiation and so the rate is proportional to $T_p^4 - T_a^4$, where $T_p$ is the temperature of the blackened junction and $T_a$ is atmospheric temperature. Consequently, the voltage output of the thermocouple is low and so it is usually necessary to connect many thermocouples in series to obtain a measurable output. Also, as the output of the thermocouple is a non-linear function of the irradiation level, complicated circuitry is required to calculate the irradiation level. Known radiometers are responsive to radiation received over a narrow angle, usually 70°, whereas a radiometer for use with radiant heaters should be responsive to radiation over an angle approaching 180°.

It is accordingly an object of this invention to provide a radiometer which is of simple construction and which is responsive to irradiation received over a wide angle.

According to one aspect of this invention there is provided a thermal radiometer comprising a housing, a shutter mounted on a wall of the housing, a thermally conductive element positioned behind the shutter, said conductive element having a black surface facing the shutter, and means for measuring the temperature of the conductive element.

Thus, this invention provides a radiometer of simple construction and which is capable of measuring radiation over a wide angle.

Preferably, the conductive element is mounted on a base member formed from a thermally insulating material.

Preferably, the outer face of the shutter is thermally reflective.

Conveniently, the radiometer includes means for calculating the rate of temperature rise of the conductive element after opening the shutter and an indicator responsive to the calculating means for displaying a value which is proportional to said rate of temperature rise.

It is another object of this invention to provide a method of measuring thermal irradiation which is simple and which is capable of measuring irradiation received over a wide angle.

Thus, according to another aspect of this invention there is provided a method of measuring thermal irradiation, said method comprising positioning a thermally conductive element having a black surface behind a shutter with the black surface facing the shutter, allowing the element to assume ambient temperature, opening the shutter and measuring the subsequent rate of temperature rise of the element, and using the rate of temperature rise to determine the level of irradiation.

The rate of temperature rise may be measured by measuring the change of temperature of the conductive element during a preset period after opening the shutter.

An embodiment of the invention will now be described, by way of example, reference being made to the accompanying drawings, in which.

Figure 1:
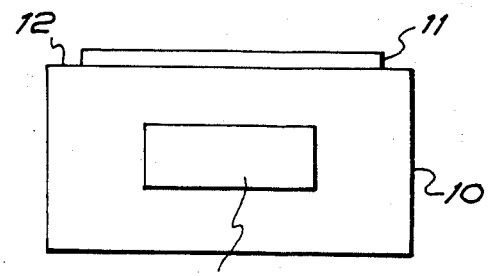
FIG. 1 is a side view of a radiometer embodying the invention.

Referring to the drawings and firstly to FIG. 1, the radiometer comprises a housing 10 and a shutter 11 mounted on its top wall 12. The upper surface of the shutter 11 is thermally reflective and, in order to achieve this, the shutter 11 may be formed from a reflective material such as aluminum. The radiometer further includes a thermal sensor 13 shown in FIG. 2, an electronic circuit shown in FIG. 3, and a liquid crystal display (LCD) 20.

Figure 2:
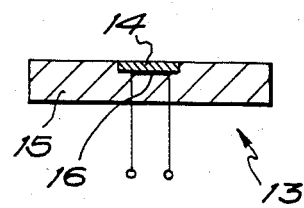
FIG. 2 is a sectional view of a radiation sensor forming part of the radiometer of FIG. 1.

Refering now to FIG. 2, the thermal sensor 13 is mounted immediately beneath the shutter 11 and comprises a thermally conductive element 14 in the form of a thin circular disc of copper which is mounted in an insulating member 15 which may be formed from expanded polystyrene. The upper surface of element 14 which faces the shutter 11 is blackened. This may be achieved by etching the surface with a solution of potassium sulphide in hydrochloric acid so as to form copper sulphide. The purpose of blackening the surface of element 14 is to promote heat absorption and copper sulphide formed in this way is particularly suitable for this purpose as the crystal structure of the copper sulphide is linked to the crystal structure of the copper. The element 14 may be formed of any other highly conductive material and may be formed, for example, from silver. A film thermocouple 16 is positioned on the underside of element 14 to sense temperature. In the present example, the thermocouple is a chromium nickel/aluminum nickel thermocouple but any suitable thermocouple or other temperature sensor such as a thermodiode may be used.

Figure 3:
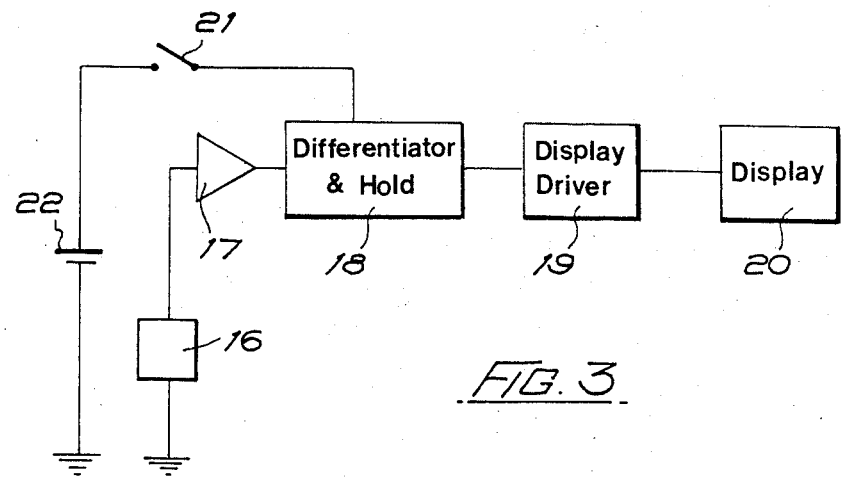
FIG. 3 is a block diagram of the circuitry used in the radiometer.

Referring now to FIG. 3, the thermocouple 16 is connected between earth and the input of a thermocouple amplifier 17 and the output of amplifier 17 is connected to the input of a differentiator and hold circuit 18. The output of circuit 18 is connected to the input of a display driver 19 which drives display 20. The circuit also includes a switch 21 and a battery 22 connected between earth and a control terminal of the circuit 18. The switch 21 is closed momentarily upon operation of shutter 11.

Figure 4:
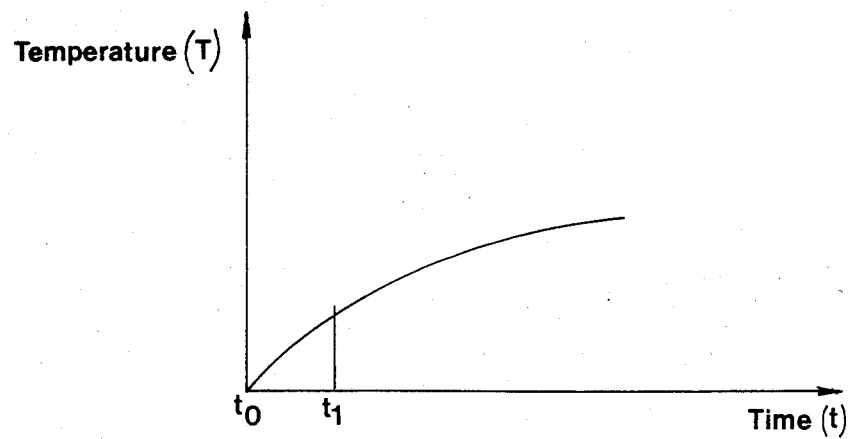
FIG. 4 is a graph for explaining the operation of the radiometer.

In operation, the radiometer is positioned where it is desired to measure the irradiation level. Initially the shutter 11 is closed and so the element 14 is allowed to assume the ambient temperature. The shutter 11 is then opened with the result that the radiation is absorbed by element 14. The temperature (T) of element 14 will the increase with time (t) as shown in FIG. 4.

As element 14 is mounted in insulating member 15, there is neglible heat loss by conduction or convection. Also, immediately upon opening the shutter 11, element 14 is at atmospheric temperature and so there is no heat loss by radiation. Thus, the initial rate of temperature rise is related to the levbel of irradiation $Q_R$ or by the following equation:

$$Q_R = C \cdot dT/dt$$

where C is the heat capacity of element 14.

Thus, by measuring the rate of temperature rise, the level of irradiation may be calculated. As the temperature rise is initially substantially linear the rate of temperature rise may be obtained by measuring the increase in temperature (T) over a short interval such as the interval $t_0$ to $t_1$ shown in FIG. 4. In the differentiator and hold circuit 18, the temperature rise during a five second interval after opening shutter 11 is measured, multiplied by an appropriate constant, and supplied to display driver 19 which causes the level of irradiation to be displayed on LCD 20.

Figure 5:
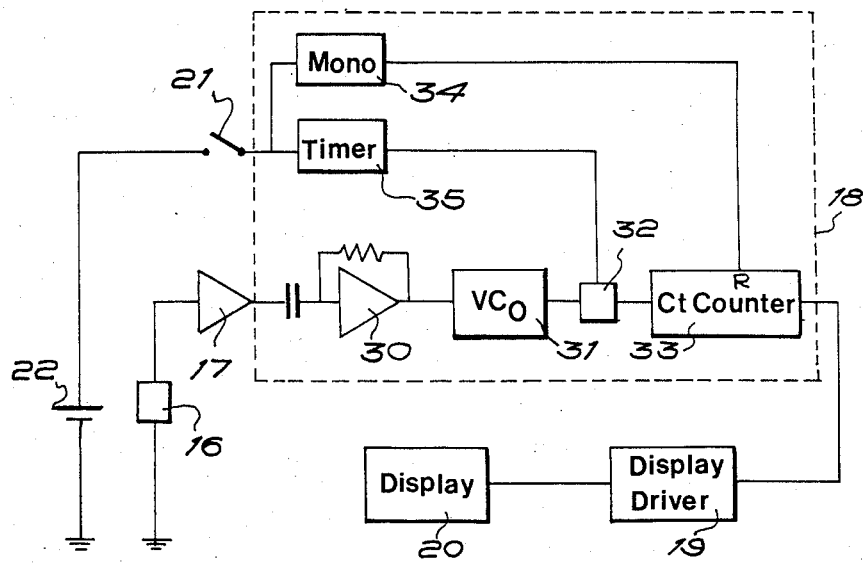
FIG. 5 is a more detailed diagram of one example of the circuitry.

An example of the differentiator and hold circuit is shown in FIG. 5. In this example, the output of an amplifier 17 is connected to the input of an operational amplifier 30 which is connected as a differentiator and the output of which is connected to the input of a voltage controlled oscillator 31. The output of oscillator 31 is connected through a switch 32 to a clock input Ct of a counter 33. Also, in this example, switch 21 is connected to the input of a monostable multivibrator 34 and to the input of a timer 35. The output of monostable multivibrator 34 is connected to the reset input R of counter 33 and timer 35 controls switch 32.

In operation, when switch 21 closes upon operation of the shutter, monostable multivibrator 34 supplies a pulse to the reset input R of counter 33 thereby resetting it and timer 35 opens switch 32 for five seconds. At the end of this five second interval, the output of the counter 33 indicates the average rate of temperature rise during the five second interval and this value is supplied to display driver 19 for display on LCD 20. The display may be made to read the actual value of irradiation either by adjusting the frequency-to-voltage setting of oscillator 31 appropriately or by including a multiplication element in display driver 19.

The radiometer shown in FIGS. 1 to 3 may be simplified by connecting the output of amplifier 17 to a graph plotter and omitting components 15, 18 and 19. The rate of temperature rise and level of irradiation may then be calculated from the resulting graphs.

I claim:

1. A thermal radiometer comprising:
   a housing,
   a shutter mounted on a wall of the housing, said shutter having an outer thermally reflective surface and an inner surface,
   a thermally conductive element located within said housing and positioned behind the shutter, said conductive element having a black surface facing the inner surface of said shutter,
   means for measuring the temperature of the conductive element, and
   indicator means responsive to said measuring means for displaying a value which is proportional to the rate of temperature rise of the conductive element after opening the shutter.

2. A thermal radiometer according to claim 1, wherein the conductive element is mounted on a base memeber formed from a thermally insulating material 3. A thermal radiometer according to claim 1, wherein the radiometer includes means for calculating the rate of temperature rise of the conductive element after opening the shutter and said indicator means is responsive to the calculating means for displaying a value which is proportional to said rate of temperature rise.

4. A method of measuring thermal irradiation, said method comprising the steps of:
   positioning a thermally conductive element having a black surface within a housing,
   mounting a shutter on a wall of the housing,
   positioning the thermally conductive element behind the shutter, the shutter having an outer thermally reflective surface and an inner surface, with the black surface facing the inner surface of the shutter,
   allowing the element to assume ambient temperature,
   opening the shutter,
   measuring the temperature of the element, and
   determining the level of irradiation by determining the rate of temperature rise of the element.

5. A method according to claim 4 wherein the rate of temperature rise is measured by measuring the change of temperature of the conductive element during a preset period after opening the shutter.

* * * * *

UNITED STATES PATENT AND TRADEMARK OFFICE
CERTIFICATE OF CORRECTION

PATENT NO. : 4,702,618

DATED : October 27, 1987

INVENTOR(S) : John K. Maund

It is certified that error appears in the above-identified patent and that said Letters Patent is hereby corrected as shown below:

```
Column 2, Line 67, change "the" to --then--.

Column 3, Line 6, change "levbel" to --level--.

Column 4, Line 21, change "memeber" to --member--.
```

Signed and Sealed this

Twentieth Day of September, 1988

Attest:

DONALD J. QUIGG

*Attesting Officer*         *Commissioner of Patents and Trademarks*